(12) United States Patent
Connors et al.

(10) Patent No.: US 7,766,568 B2
(45) Date of Patent: Aug. 3, 2010

(54) PRINTHEAD CARRIER HAVING ZERO CLEARANCE BEARING ARRANGEMENT

(75) Inventors: William Michael Connors, Lexington, KY (US); Stephen Edward Stewart, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 477 days.

(21) Appl. No.: 11/872,086

(22) Filed: Oct. 15, 2007

(65) Prior Publication Data
US 2009/0097896 A1   Apr. 16, 2009

(51) Int. Cl.
*B41J 1/36* (2006.01)
*B41J 19/20* (2006.01)

(52) U.S. Cl. .......................... 400/354; 400/283; 347/37
(58) Field of Classification Search .................. 400/352, 400/354, 53, 161, 283; 347/37, 39
See application file for complete search history.

(56) References Cited

U.S. PATENT DOCUMENTS

| | | |
|---|---|---|
| 4,595,936 A | 6/1986 | Nakajima et al. |
| 4,755,836 A | 7/1988 | Ta et al. |
| 5,087,141 A | 2/1992 | Kelly |
| 5,245,361 A | 9/1993 | Kashimura et al. |
| 5,346,320 A | 9/1994 | Nguyen |
| 5,366,305 A | 11/1994 | Christianson |
| 5,466,077 A | 11/1995 | Movaghar et al. |
| 5,579,039 A | 11/1996 | Kurata et al. |
| 5,596,241 A | 1/1997 | Seki et al. |
| 5,684,518 A | 11/1997 | Nobel et al. |
| 5,924,809 A | 7/1999 | Wotton et al. |
| 6,007,184 A | 12/1999 | Terasawa et al. |
| 6,070,976 A | 6/2000 | Takagi et al. |
| 6,102,519 A | 8/2000 | Yasui et al. |
| 6,152,558 A | 11/2000 | Togashi et al. |
| 6,161,920 A | 12/2000 | Santhanam et al. |

*Primary Examiner*—Leslie J Evanisko

(57) ABSTRACT

A printhead carrier having a zero clearance bearing arrangement includes a first open-faced bearing coupled to a dampener frame. The first open-faced bearing has a first bearing surface positioned to contact the cylindrical guide surface of a guide rod of an imaging apparatus. A second open-faced bearing is coupled to the dampener frame. The second open-faced bearing has a second bearing surface positioned to contact the cylindrical guide surface of the guide rod. The guide rod is diametrically positioned between the first open-faced bearing and the second open-faced bearing. An elastic foam member is interposed between the first open-faced bearing and the dampener frame. The elastic foam member is compressed to exert an expansion force between the first open-faced bearing and the dampener frame to load the second open-faced bearing on the guide rod in a zero-clearance relationship with the guide rod.

20 Claims, 3 Drawing Sheets

PRINTHEAD CARRIER HAVING ZERO CLEARANCE BEARING ARRANGEMENT

CROSS-REFERENCE TO RELATED APPLICATIONS

None.

MICROFICHE APPENDIX

None.

GOVERNMENT RIGHTS IN PATENT

None.

BACKGROUND OF THE INVENTION

1. Field of the Invention

The present invention relates to an imaging apparatus, and, more particularly, to a printhead carrier having a zero clearance bearing arrangement.

2. Description of the Related Art

The quality of the formed image is dependent, at least in part, on the tolerances and alignment of various components in the printing system. A typical ink jet printer, for example, includes a printer frame mounting a series of rollers that define a media path for a sheet of media. The sheet of print media is transported by the rollers along the media path through a print zone. In the print zone, one or more printheads carried by a reciprocating printhead carrier eject ink onto the sheet at predefined locations to form an image thereon.

The printhead carrier is guided by one or more guide rods which extend in a direction transverse to the direction of media travel. The carrier includes fixed bearings which contact a guide surface of each of the one or more guide rods.

Although this configuration may provide adequate printing results, in such an arrangement the interface between the printhead carrier and the guide rod(s) may induce vibrations that result in positioning and alignment errors between the physical location of the print nozzles of the printhead and the desired print locations on the sheet of print media, as well as may be a source of undesirable noise in the printing apparatus.

SUMMARY OF THE INVENTION

The present invention provides a printhead carrier having a zero clearance bearing arrangement.

The terms "first" and "second" preceding an element name, e.g., first open-faced bearing, second open-faced bearing, etc., are used for identification purposes to distinguish between similar or related elements, and are not intended to necessarily imply order, nor are the terms "first" and "second" intended to preclude the inclusion of additional similar or related elements.

The invention, in one form thereof, is directed to a printhead carrier having a zero clearance bearing arrangement for use in an imaging apparatus having a guide rod. The guide rod extends lengthwise in a direction of extension along a first axis and has a cylindrical guide surface. The printhead carrier includes a carrier body, and a dampener frame to which the carrier body is mounted. A first open-faced bearing is coupled to the dampener frame. The first open-faced bearing has a first bearing surface positioned to contact the cylindrical guide surface of the guide rod. A second open-faced bearing is coupled to the dampener frame. The second open-faced bearing has a second bearing surface positioned to contact the cylindrical guide surface of the guide rod. The guide rod is diametrically positioned between the first open-faced bearing and the second open-faced bearing. An elastic foam member is interposed between the first open-faced bearing and the dampener frame. The elastic foam member is compressed to exert an expansion force between the first open-faced bearing and the dampener frame to load the second open-faced bearing on the guide rod in a zero-clearance relationship with the guide rod.

The invention, in another form thereof, is directed to an imaging apparatus. The imaging apparatus includes a main frame, and a guide rod mounted to and suspended by the frame. The guide rod extends lengthwise in a direction of extension along a first axis and has a cylindrical guide surface. A printhead carrier is slidably coupled to the guide rod. The printhead carrier includes a carrier body, and a dampener frame to which the carrier body is mounted. A first open-faced bearing is coupled to the dampener frame. The first open-faced bearing has a first bearing surface positioned to contact the cylindrical guide surface of the guide rod. A second open-faced bearing is coupled to the dampener frame. The second open-faced bearing has a second bearing surface positioned to contact the cylindrical guide surface of the guide rod. The guide rod is diametrically positioned between the first open-faced bearing and the second open-faced bearing. An elastic foam member is interposed between the first open-faced bearing and the dampener frame. The elastic foam member is compressed to exert an expansion force between the first open-faced bearing and the dampener frame to load the second open-faced bearing on the guide rod in a zero-clearance relationship with the guide rod.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
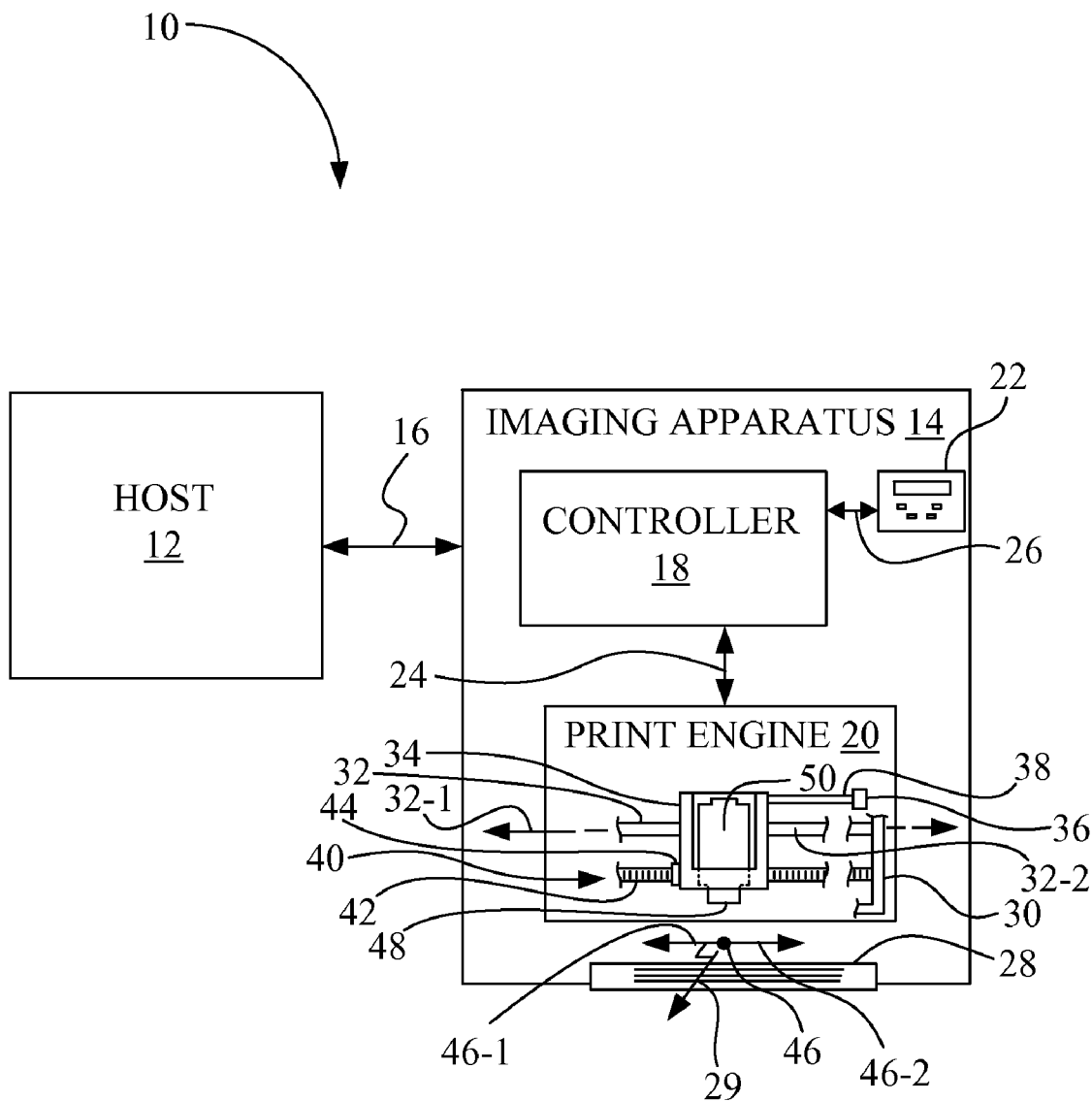
FIG. 1 is a diagrammatic depiction of an imaging system including an imaging apparatus embodying the present invention.

Referring now to the drawings and particularly to FIG. 1, there is shown a diagrammatic depiction of an imaging system 10. Imaging system 10 may include a host 12 and an imaging apparatus 14 configured in accordance with an embodiment of the present invention.

Imaging apparatus 14 communicates with host 12 over a communication link 16. As used herein, the term "communications link" is used to generally refer to structure that facilitates electronic communication between multiple components, and may operate using wired or wireless technology. Imaging apparatus 14 may communicate with host 12 via a standard communication protocol, such as for example, universal serial bus (USB), Ethernet or IEEE 802.xx, etc.

As used herein, the term "imaging apparatus" is a device that forms a printed image on a print medium. In the embodiment shown in FIG. 1, imaging apparatus 14 is shown as a printer that includes a controller 18, a print engine 20 and a user interface 22. Alternatively, imaging apparatus 14 may be a standalone unit that is not communicatively linked to a host, such as host 12. For example, imaging apparatus 14 may take the form of an all-in-one, i.e., multifunction, machine that includes a scanner to facilitate standalone copying and facsimile capabilities, in addition to optionally serving as a printer when attached to a host, such as host 12.

Host 12 may be, for example, a personal computer including an input/output (I/O) device, such as keyboard and display monitor. Host 12 further includes a processor, input/output (I/O) interfaces, memory, such as RAM, ROM, NVRAM, and a mass data storage device, such as a hard drive, CD-ROM and/or DVD units. During operation, host 12 may include in its memory a software program including program instructions that function as an imaging driver, e.g., printer driver software, for imaging apparatus 14. Alternatively, the imaging driver may be incorporated, in whole or in part, in imaging apparatus 14.

Controller 18 of imaging apparatus 14 includes a processor unit and associated memory, and may be formed as an Application Specific Integrated Circuit (ASIC). Controller 18 communicates with print engine 20 by way of a communications link 24. Controller 18 communicates with user interface 22 by way of a communications link 26. Communications links 24 and 26 may be established, for example, by using standard electrical cabling or bus structures, or by wireless connection.

In the present embodiment, print engine 20 of imaging apparatus 14 is an ink jet print engine configured for forming an image on a sheet of print media 28, such as a sheet of paper, transparency or fabric that is transported in a sheet feed direction 29.

Print engine 20 may include, for example, a main frame 30, a guide rod 32, a reciprocating printhead carrier 34, a drive motor 36, a drive belt 38, and a carrier position encoder 40. Carrier position encoder 40 includes a linear encoder strip 42 and an encoder sensor 44. Printhead carrier 34 is slidably coupled to guide rod 32. Drive belt 38 is connected to printhead carrier 34, and is driven by drive motor 36 operating under the control of controller 18.

Guide rod 32 is mounted to and suspended by main frame 30. Guide rod 32 extends lengthwise in a direction of extension along an axis 32-1 and defines a bi-directional main scan path 46, including direction 46-1 and direction 46-2. Axis 32-1 and bi-directional main scan path 46 are each perpendicular to sheet feed direction 29. Guide rod 32 has a smooth cylindrical guide surface 32-2.

During a printing operation, guide rod 32 guides printhead carrier 34 back and forth along bi-directional main scan path 46, with drive motor 36 and drive belt 38 providing the motive force to move printhead carrier 34. Encoder sensor 44 of carrier position encoder 40 is communicatively coupled to controller 18, and reads linear encoder strip 42 as printhead carrier 34 is moved so as to provide carrier position data to controller 18 corresponding to a relative linear position of printhead carrier 34 along bi-directional main scan path 46.

Printhead carrier 34 is mechanically and electrically configured to mount and carry at least one printhead 48. Each printhead 48 is in fluid communication with at least one ink tank 50. In one embodiment, for example, printhead 48 and ink tank 50 and may be formed as an integral printhead cartridge, so as to be replaceable as a non-separable unit. In another embodiment, printhead 48 and ink tank 50 may be designed to be separable, so as to be individually replaceable, with printhead 48 being semi-permanently mounted to printhead carrier 34 (i.e., usable with multiple replaceable ink tanks 50), and with each ink tank 50 being replaceably coupled to printhead carrier 34 and printhead 48. In either embodiment, during a printing operation printhead carrier 34 transports printhead 48 in a reciprocating manner over an image surface of the sheet of print media 28. Based on print commands provided by controller 18, printhead 48 selective ejects ink to form an image on the sheet of print media 28.

Figure 2:
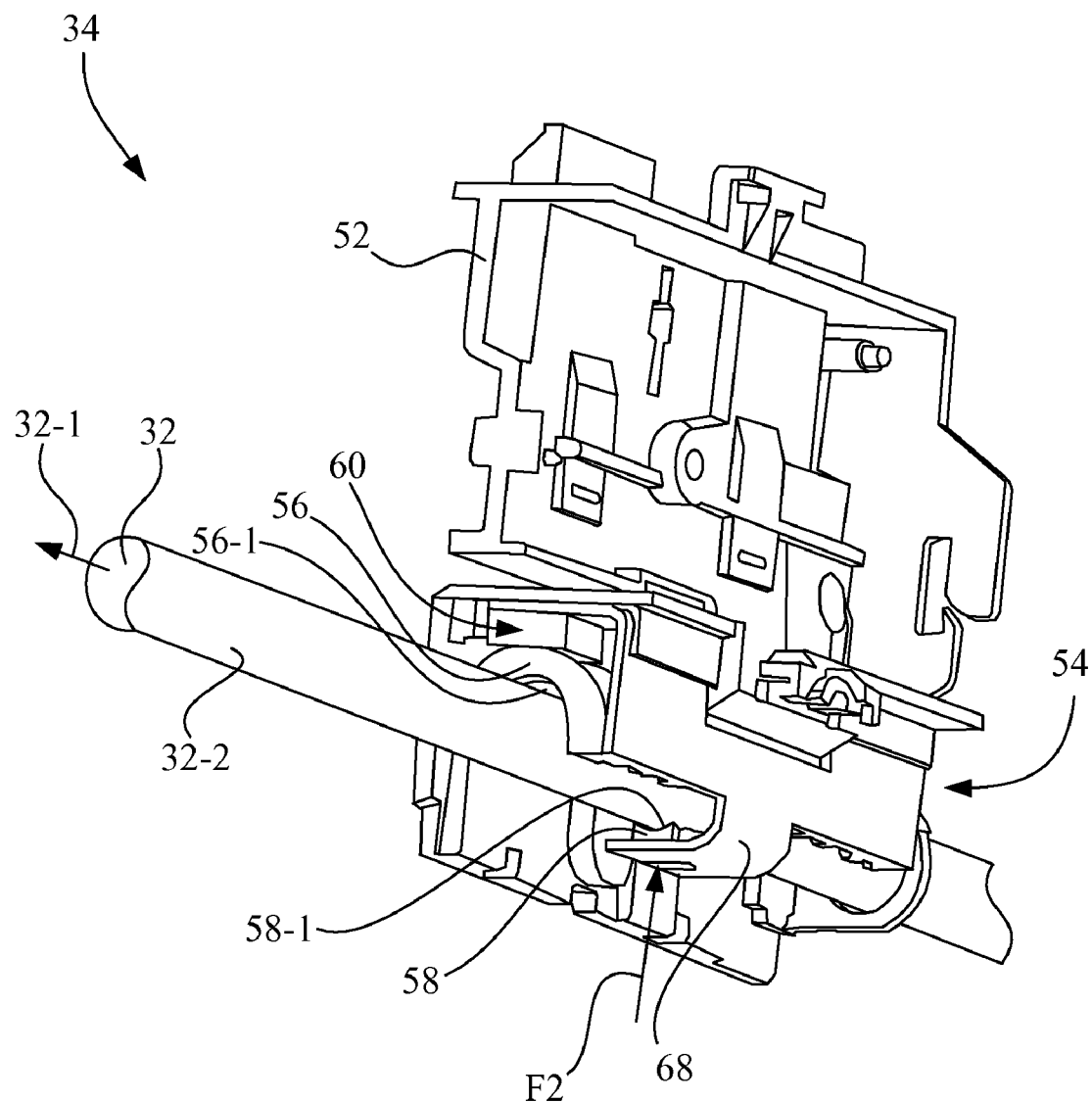
FIG. 2 is a perspective view of a portion of the printhead carrier of the imaging apparatus of FIG. 1.
Figure 3:
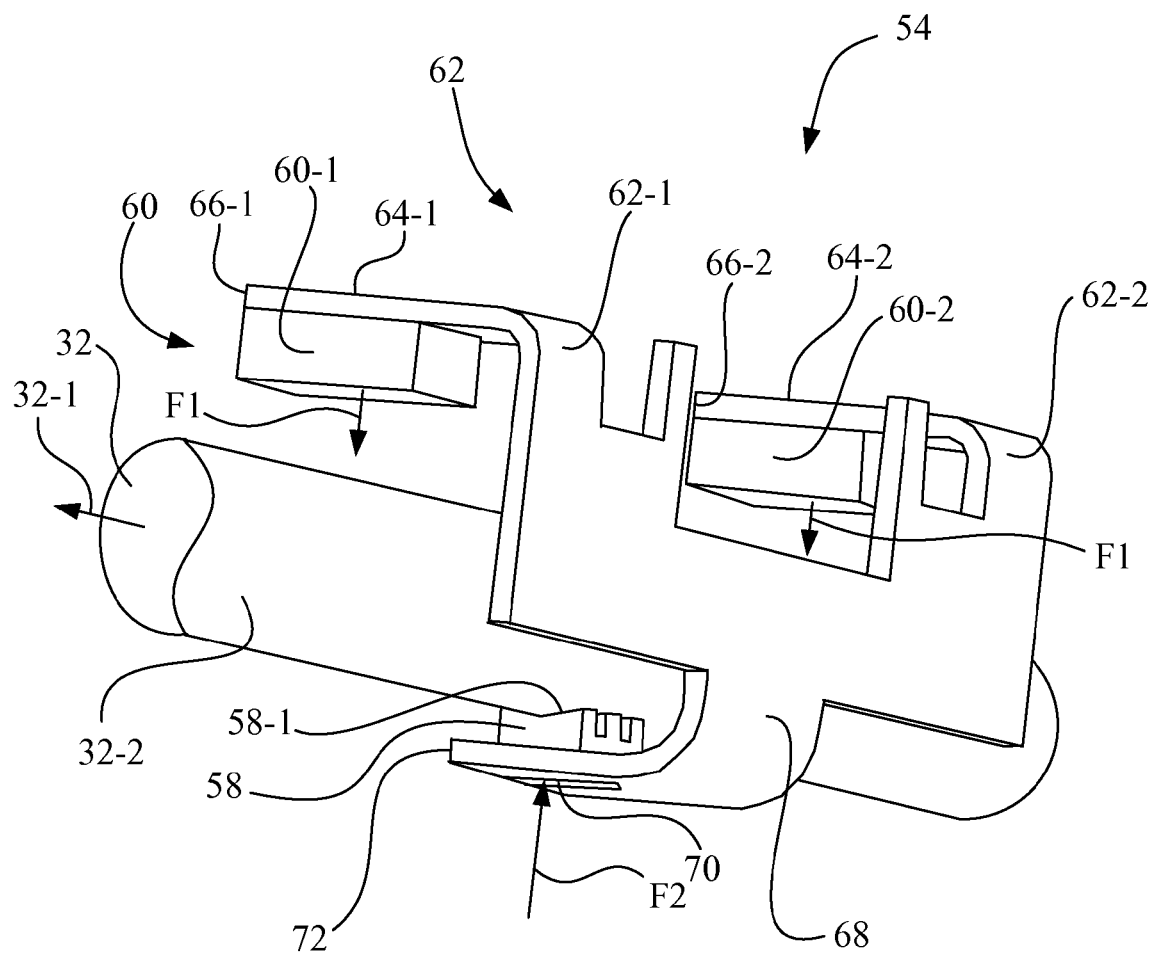
FIG. 3 is a perspective view of a portion of the printhead carrier of FIG. 2, with the upper bearing removed to expose the two portions of an elastic foam member which when in compression exert an expansion force F1.

Referring also to FIGS. 2 and 3, printhead carrier 34 includes a carrier body 52, a dampener frame 54, a first open-faced bearing 56, a second open-faced bearing 58 and an elastic foam member 60. Carrier body 52 is mounted to dampener frame 54.

Dampener frame 54 is configured as a C-shaped structure, and may be formed from sheet metal. A thickness of the sheet metal may be, for example, about 1.0 millimeters. The C-shaped structure of dampener frame 54 includes an upper pair of cantilever members 62, individually identified as cantilever member 62-1 and cantilever member 62-2, having respective distal portions 64-1, 64-2 the terminate at respective distal ends 66-1, 66-2. The C-shaped structure of dampener frame 54 also includes a lower cantilever member 68 having a distal portion 70 that terminates at distal end 72.

First, e.g., upper, open-faced bearing 56 is coupled to dampener frame 54, via elastic foam member 60. This coupling may be, for example, by adhesive layers, or a retainer device. First open-faced bearing 56 may be formed, for example, from a polymer, such as polyoxymethylene (POM). First open-faced bearing 56 has a bearing surface 56-1 that is positioned to contact an upper portion of cylindrical guide surface 32-2 of guide rod 32. Bearing surface 56-1 of first open-faced bearing 56 may be formed, for example, as a curved bearing surface. First open-faced bearing 56 is elongate in the direction of extension of guide rod 32, i.e., along axis 32-1.

Second, e.g., lower, open-faced bearing 58 is coupled to dampener frame 54. More particularly, in the present embodiment, second open-faced bearing 58 is mounted to distal portion 70 of cantilever member 68, e.g., by an adhesive or a retainer device. Second open-faced bearing 58 may be formed, for example, from a polymer, such as POM. Second open-faced bearing 58 has a bearing surface 58-1 positioned to contact cylindrical guide surface 32-2 of guide rod 32. Bearing surface 58-1 of second open-faced bearing 58 may be formed, for example, as a V-shaped bearing surface, so as to cradle guide rod 32 and contact cylindrical guide surface 32-2 of guide rod 32 simultaneously along two lines of contact. Guide rod 32 is diametrically positioned between first open-faced bearing 56 and second open-faced bearing 58, with first open-faced bearing 56 and second open-faced bearing 58 facing one another.

Elastic foam member 60 is interposed between first open-faced bearing 56 and dampener frame 54. Elastic foam member 60 may be made, for example, of a high density cellular urethane, e.g., having a density in a range of 15 to 30 pounds per cubic feet. A commercial product that may be used for making elastic foam member 60 is sold under the trademark PORON® by Rogers Corporation of Rogers, Conn.

As printhead carrier 34 is assembled on guide rod 32, elastic foam member 60 is compressed to exert an expansion force F1 between first open-faced bearing 56 and dampener frame 54 to load second open-faced bearing 58 on guide rod 32 in a zero clearance relationship with guide rod 32, thereby forming a zero clearance bearing arrangement. The amount of load exerted by elastic foam member 60 on guide rod 32 is dependent on an amount of compression of elastic foam member 60 and/or a foam density of elastic foam member 60. The load exerted by elastic foam member 60 exerting expansion force F1 (e.g., downward) results in an equal and opposite force F2 (e.g., upward) exerted by second bearing 58 on guide rod 32.

In the particular embodiment shown in FIGS. 2 and 3, elastic foam member 60 may be separated into a first elastic foam portion 60-1 spaced from a second elastic foam portion 60-2 in the direction of extension of guide rod 32, i.e., along axis 32-1. First elastic foam portion 60-1 may be attached, e.g., by adhesive, to distal portion 64-1 of cantilever member 62-1. Second elastic foam portion 60-2 may be attached, e.g., by adhesive, to distal portion 64-2 of cantilever member 62-2. Second open-faced bearing being 58 is located intermediate of first elastic foam portion 60-1 and second elastic foam portion 60-2 with respect to axis 32-1, and located vertically below first open-faced bearing 56. Guide rod 32 is diametrically interposed between first open-faced bearing 56 and second open-faced bearing 58.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A printhead carrier having a zero clearance bearing arrangement for use in an imaging apparatus having a guide rod, said guide rod extending lengthwise in a direction of extension along a first axis and having a cylindrical guide surface, comprising:
   a carrier body;
   a dampener frame to which said carrier body is mounted;
   a first open-faced bearing coupled to said dampener frame, said first open-faced bearing having a first bearing surface positioned to contact said cylindrical guide surface of said guide rod;
   a second open-faced bearing coupled to said dampener frame, said second open-faced bearing having a second bearing surface positioned to contact said cylindrical guide surface of said guide rod, said guide rod being diametrically positioned between said first open-faced bearing and said second open-faced bearing; and
   an elastic foam member interposed between said first open-faced bearing and said dampener frame, said elastic foam member being compressed to exert an expansion force between said first open-faced bearing and said dampener frame to load said second open-faced bearing on said guide rod in a zero-clearance relationship with said guide rod.

2. The printhead carrier of claim 1, wherein said load on said guide rod is dependent on an amount of compression of said elastic foam member.

3. The printhead carrier of claim 1, wherein said load on said guide rod is dependent on a foam density of said elastic foam member.

4. The printhead carrier of claim 1, wherein said elastic foam member is made of high density cellular urethane having a density in a range of 15 to 30 pounds per cubic feet.

5. The printhead carrier of claim 1, wherein said first bearing surface of said first open-faced bearing is a curved bearing surface arranged to engage said cylindrical guide surface of said guide rod.

6. The printhead carrier of claim 1, wherein said second bearing surface of said second open-faced bearing is a V-shaped bearing surface arranged to engage said cylindrical guide surface of said guide rod.

7. The printhead carrier of claim 6, wherein said second open-faced bearing is formed from a polyoxymethylene material.

8. The printhead carrier of claim 1, wherein said first open-faced bearing is elongate in said direction of extension of said guide rod, said elastic foam member being separated into a first elastic foam portion spaced from a second elastic foam portion in said direction of extension of said guide rod, said second open-faced bearing being located intermediate of said first elastic foam portion and said second elastic foam portion.

9. The printhead carrier of claim 1, wherein said dampener frame includes a cantilever member having a distal portion terminating at a free end, said second open-faced bearing being mounted to said distal portion of said cantilever member.

10. The printhead carrier of claim 9, wherein said load exerted by said elastic foam member results in an equal and opposite force exerted by said second bearing on said guide rod.

11. An imaging apparatus, comprising:
    a main frame;
    a guide rod mounted to and suspended by said frame, said guide rod extending lengthwise in a direction of extension along a first axis and having a cylindrical guide surface;
    a printhead carrier slidably coupled to said guide rod, said printhead carrier including:
    a carrier body;
    a dampener frame to which said carrier body is mounted;
    a first open-faced bearing coupled to said dampener frame, said first open-faced bearing having a first bearing surface positioned to contact said cylindrical guide surface of said guide rod;
    a second open-faced bearing coupled to said dampener frame, said second open-faced bearing having a second bearing surface positioned to contact said cylindrical guide surface of said guide rod, said guide rod being diametrically positioned between said first open-faced bearing and said second open-faced bearing; and
    an elastic foam member interposed between said first open-faced bearing and said dampener frame, said elastic foam member being compressed to exert an expansion force between said first open-faced bearing and said dampener frame to load said second open-faced bearing on said guide rod in a zero-clearance relationship with said guide rod.

12. The imaging apparatus of claim 11, wherein said load on said guide rod is dependent on an amount of compression of said elastic foam member.

13. The imaging apparatus of claim 11, wherein said load on said guide rod is dependent on a foam density of said elastic foam member.

14. The imaging apparatus of claim 11, wherein said elastic foam member is made of high density cellular urethane having a density in a range of 15 to 30 pounds per cubic feet.

15. The imaging apparatus of claim 11, wherein said first bearing surface of said first open-faced bearing is a curved bearing surface arranged to engage said cylindrical guide surface of said guide rod.

16. The imaging apparatus of claim 11, wherein said second bearing surface of said second open-faced bearing is a V-shaped bearing surface arranged to engage said cylindrical guide surface of said guide rod.

17. The imaging apparatus of claim 16, wherein said second open-faced bearing is formed from a polyoxymethylene material.

18. The imaging apparatus of claim 11, wherein said first open-faced bearing is elongate in said direction of extension of said guide rod, said elastic foam member being separated into a first elastic foam portion spaced from a second elastic foam portion in said direction of extension of said guide rod, said second open-faced bearing being located intermediate of said first elastic foam portion and said second elastic foam portion.

19. The imaging apparatus of claim 11, wherein said dampener frame includes a cantilever member having a distal portion terminating at a free end, said second open-faced bearing being mounted to said distal portion of said cantilever member.

20. The imaging apparatus of claim 19, wherein said load exerted by said elastic foam member results in an equal and opposite force exerted by said second bearing on said guide rod.

* * * * *